(No Model.) 2 Sheets—Sheet 1.

H. A. WEEKS.
GAS ENGINE.

No. 543,818. Patented July 30, 1895.

Witnesses.
O. N. Keeney
Anna V. Faust

Inventor,
Henry A. Weeks
By Benedict & Morsell
Attorneys.

(No Model.) 2 Sheets—Sheet 2.

H. A. WEEKS.
GAS ENGINE.

No. 543,818. Patented July 30, 1895.

Witnesses.
O. N. Keeney.
Anna V. Faust.

Inventor.
Henry A. Weeks,
By Benedict & Morsell
Attorneys.

UNITED STATES PATENT OFFICE.

HENRY A. WEEKS, OF LAKE GENEVA, WISCONSIN, ASSIGNOR TO WILLIS J. PERKINS, OF GRAND RAPIDS, MICHIGAN.

GAS-ENGINE.

SPECIFICATION forming part of Letters Patent No. 543,818, dated July 30, 1895.

Application filed March 30, 1894. Renewed June 6, 1895. Serial No. 551,912. (No model.)

*To all whom it may concern:*

Be it known that I, HENRY A. WEEKS, of Lake Geneva, in the county of Walworth and State of Wisconsin, have invented a new and useful Improvement in Gas-Engines, of which the following is a description, reference being had to the accompanying drawings, which are a part of this specification.

My invention has relation to improvements in gas-engines of the class of internal-combustion engines designed to develop power from a suitable hydrocarbon.

The invention has for its object to avoid the use of gearing and other complicated mechanism to control the movements of the exhaust-valve.

With the above primary object and others in view the invention consists of the devices and parts or their equivalents as hereinafter more fully described and claimed.

Figure 1:
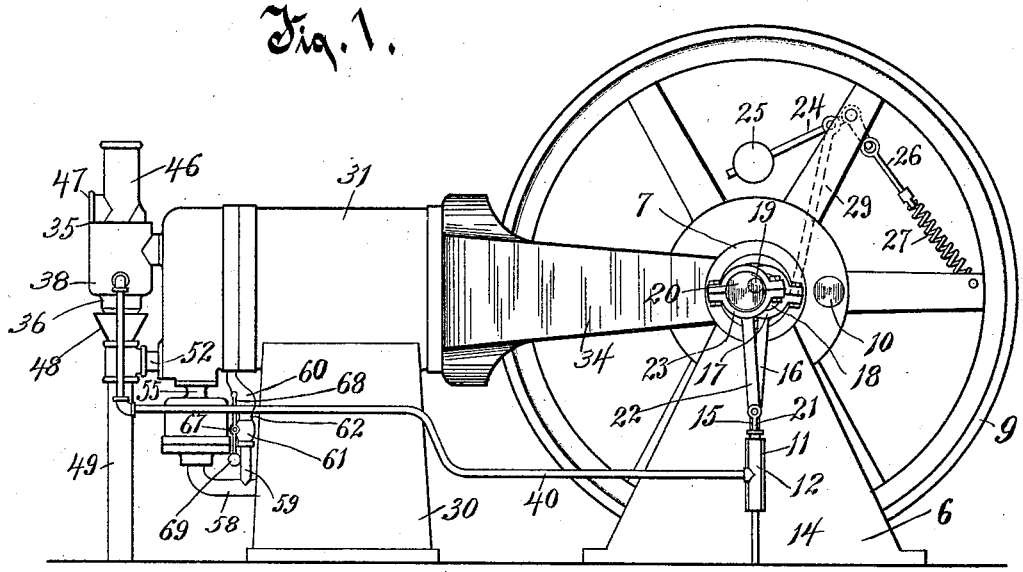
Figure 2:
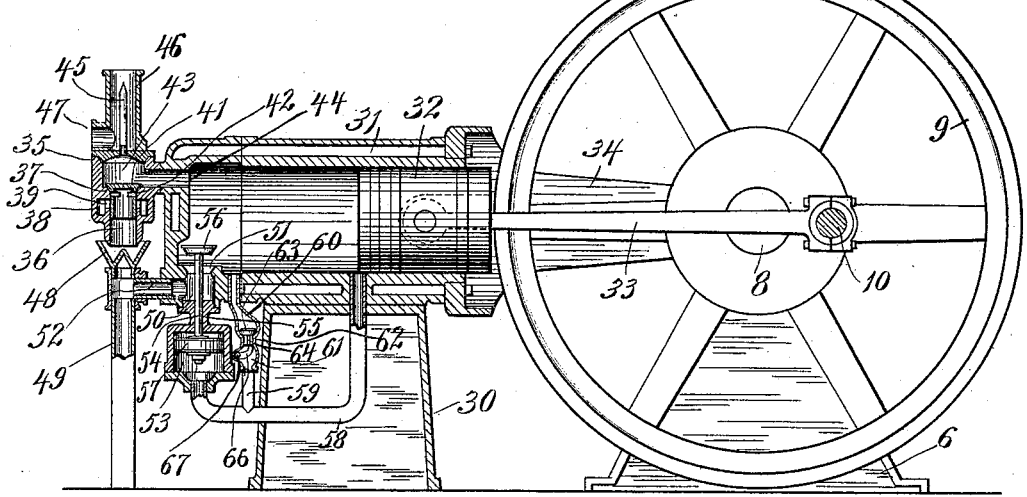
Figure 3:
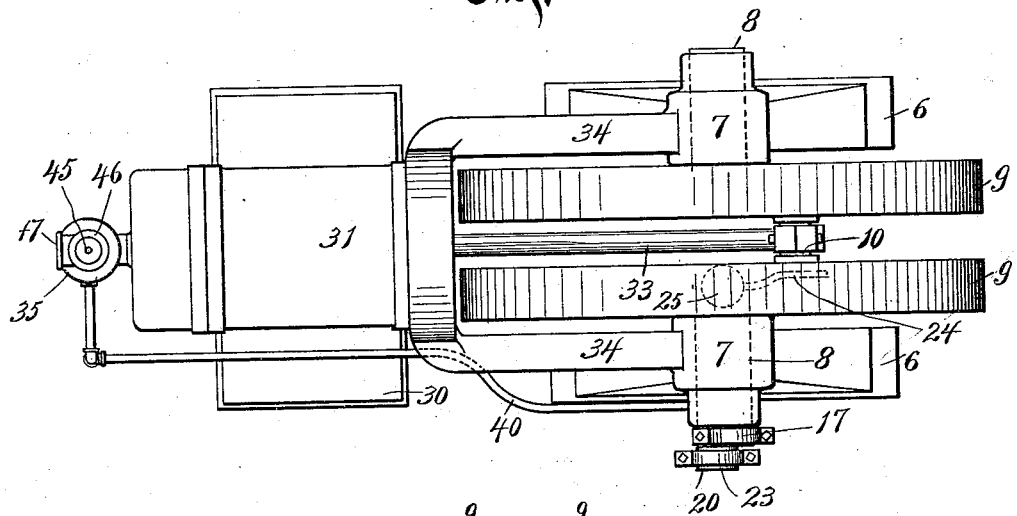
Figure 4:
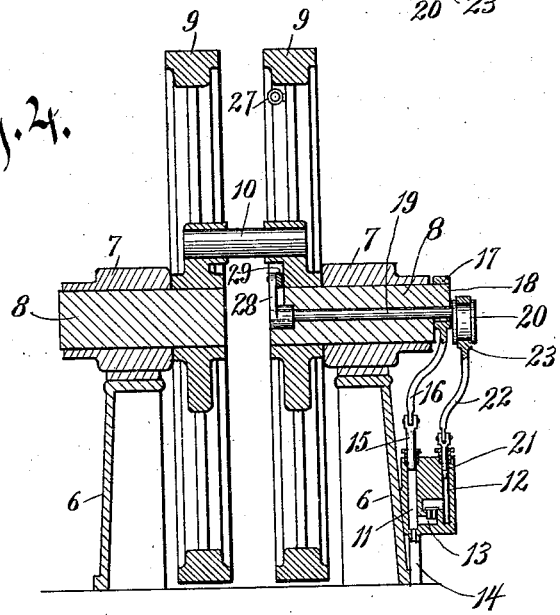
Figure 5:
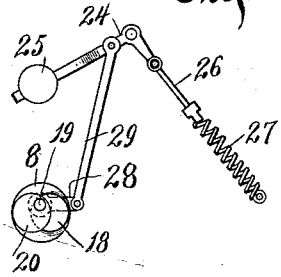

In the accompanying drawings, Figure 1 is a side elevation of the complete engine. Fig. 2 is a similar view with the cylinder and other parts in section. Fig. 3 is a plan view. Fig. 4 is a transverse section through the shafts 8 of Fig. 3, and Fig. 5 is a detail view of the governing mechanism.

Like numerals of reference denote like parts throughout the several views.

Referring to the drawings, the numerals 6 6 indicate standards which support bearings 7 7. In these bearings are journaled short shafts 8 8, which shafts have mounted upon their inner ends fly-wheels 9 9. These fly-wheels are connected rigidly together, so as to rotate synchronously, by a transverse crank-pin 10. Secured to one of the standards 6 are pumps 11 and 12, which are connected by a valve-controlled passage 13. The pump 11 is connected with a source of supply by means of a pipe 14. Working in this pump 11 is a piston 15, the piston-rod 16 thereof formed or provided at its upper end with a ring 17, which is mounted on an eccentric extension 18 from one of the shafts 8. Passing concentrically freely through this shaft 8 is a secondary shaft 19, which is provided upon its outer end with an eccentric 20. Working also in the pump 12 is a piston 21, the piston-rod 22 of which is formed or provided at its upper end with a ring 23, which surrounds the eccentric 20 of shaft 19. It will be noticed that the pump 11 is larger than its companion pump 12, and is adapted to pump from the source of supply a much greater quantity than the engine uses. Pivotally connected to one of the spokes of the right-hand fly-wheel, Fig. 4, is a bell-crank lever 24, the long arm of which lever is provided with a suitable weight 25, and the short arm thereof is connected, through a suitable link 26, to one end of a coiled spring 27, the opposite end of said spring being connected to another spoke of the fly-wheel. To the inner end of the secondary shaft 19 is connected a rock-arm 28, which, in turn, is pivoted to the lower end of a link 29, the upper end of said link being pivoted to the long arm of the bell-crank 24.

Supported by a suitable pedestal 30 is an engine-cylinder 31, within which works a piston 32, the piston-rod 33 of which projects through the rear open end of the cylinder, and is connected at its rear end to the crank-pin 10. The rear flanged end of the cylinder 31 is formed with rearward-projecting arms 34 34, between which the fly-wheels revolve, the rear ends of said arms forming an integral part of the bearings 7 7. To the front end of the cylinder 31 is connected an auxiliary casing 35, within which is formed a vertical tubular portion 36, provided at its upper end with a valve-seat 37. An evaporator-cup 38 surrounds this tubular portion 36 and communicates therewith through a passage 39. This cup is also connected with the pump 12 by means of a pipe 40. Within the part 36 works a valve 41, said valve of tubular form and provided with an open lower end and a closed upper end, the latter preferably conically shaped to fit the conical valve-seat 37. The case of this valve is provided with a series of exit-ports 42. Above the tubular part 36 a chamber 43 is formed, said chamber having communication with the cylinder 31 through a passage 44. Connected to the top of the chamber 43, so as to be in open communication therewith, is an ignition-tube 45, said tube extending into a vertical pipe 46. This pipe connects through an elbow 47 with a source of heat supply. (Not shown.) A generator-cup 48 is arranged immediately below the tube 36, said cup being connected to the upper end of a vertical pipe 49.

Extending from the under side of the cylinder 31, at the forward end thereof, is a casing forming a chamber 50, which chamber, at its point of opening into the cylinder, is formed into a valve-seat 51. The chamber also connects with the vertical pipe 49 by a connecting passage or pipe 52. Arranged below and connected to the casing of the chamber 50 is another casing, forming a chamber 53, of greater area than the chamber 50. A piston-stem 54 passes through a vertical opening in the contracted neck 55 between the two chambers, the upper end of said piston-stem carrying an exhaust-valve 56, adapted to fit the valve-seat 51, and the lower end a valve-piston 57, which fits snugly and reciprocates in the chamber 53. The end of a pipe 58 communicates with the lower end of the chamber 53, said pipe being bent up at right angles to communicate with the cylinder 31.

A tubular passage 59 connects the pipe 58 with another point of the cylinder. This pipe is formed into two bulged or enlarged portions 60 and 61, respectively, connected by a contracted neck 62. Within the upper bulged portion 60 is adapted to work a check-valve 63, the stem 64 thereof passing through the contracted neck. Within the lower bulged portion 61 is adapted to work a lever 66, said lever pivoted on a transverse rod 67, which rod is connected at its exterior extremity to a medial point of an operating-lever 68, the lower end of said operating-lever being weighted, as indicated at 69. The lever 68 is held normally by the weight in the position shown in Fig. 1 and the inner lever 66 held normally in the position shown in Fig. 2. If the outer operating-lever 68 is turned from the position shown in Fig. 1, it will have the effect of turning the inner lever 66 upwardly on its pivot, and thereby raise the check-valve 63. When the operating-lever 68 is released, the weight returns the same, together with lever 66, to their normal positions, which permits the check-valve 63 to automatically seat itself.

In the operation of my improved gas-engine the oil is forced from the pump 12 through the pipe 40 into the evaporator-cup 38. As the piston 32 moves outward, the valve 41 is raised by suction, and the oil contained in the cup 38 spills or flows over the wall of the evaporator-cup and is carried into the cylinder through the passage 44 by the air as it passes through the tube 36. The valve 41, of course, falls back on its seat as soon as suction ceases or when the piston has reached the limit of its outstroke. The valve 63 being closed, the mixture in the cylinder is of course compressed by the return stroke of the piston, and a part thereof flows through the passage 44 into the ignition-tube 45, where it is ignited by the heat entering at 47, thereby increasing its volume and driving the piston out until it opens the pipe 58 and allows the products of combustion to pass into the pipe and to act on the valve-piston 57. As the area of the valve-piston is greater than the area of the exhaust-valve 56, the pressure on said valve-piston, of course, overcomes the pressure on the exhaust-valve 56 and raises said latter valve away from its seat. At the commencement of the instroke of the piston it closes the pipe 58, thus retaining the gas in the pipe, and thereby continuing the pressure against the valve-piston 57 and holding the exhaust-valve 56 away from its seat until the contents of the cylinder have passed through the passage 52 into the discharge-pipe 49. This occurs just before the piston 32 has reached the limit of its instroke, at which point it again opens the pipe 58 and allows the gas contained in said pipe to escape back of the piston-head 32 and out of the open end of the cylinder 31. The pressure against the valve-piston 57 being removed, of course said valve-piston drops and the exhaust-valve 56 falls to its seat.

In the case of gasoline or other light oils these would be carried direct from the evaporator-cup 38 up through the tube 36 into the passage 44, and from thence to the cylinder, as above described. In the case, however, of heavy oils—such as crude petroleum and the like—these are too heavy to be drawn directly into the cylinder in the manner pointed out, and hence after entering the tube 36 they fall into the generator-cup 48, where they are converted into gaseous form by the heat imparted by the exhaust as it passes through the pipe 52 into pipe 49. The heavy oils thus converted into gaseous form are in turn carried into the cylinder 31 by the next charge of air.

The check-valve 63 comes into play at the beginning of the operation of the device or when a new charge is being drawn into the cylinder 31. As the piston 32 makes its initial outward stroke and sucks in the gas, a vacuum is formed in advance of said piston. The valve 56, it will be understood, is of course closed. The suction also acts through the pipe 60 and automatically opens valve 63, whereby the valve 56 is more firmly held to its seat while the new charge is being drawn in. On the return instroke of the piston the gas in advance of said piston is compressed, and inasmuch as valve 63 is opened said gas is forced down through the pipe 60, and acting on valve-piston 57 will raise the same and through the stem 54 open the exhaust-valve 56. This operation continues until sufficient momentum has been imparted to the fly-wheels to compress the charge and to pass the engine over the center, regardless of the compression. As soon as the desired momentum is attained, the check-valve 63 is closed by means of the lever 68. When the lever 68 is thus operated to close the check-valve 63, the gas is forced up to the ignition-tube and the operation of the engine as first described then takes place.

From the above description it is thought that the construction, operation, and advantages of my improved gas-engine will be readily understood without requiring further explanation.

The invention is simple in construction and dispenses entirely with complicated gearing or mechanism for controlling the movements of the exhaust-valve.

Having thus described my invention, what I claim, and desire to secure by Letters Patent of the United States, is—

1. In a gas engine, the combination, of a cylinder having an open end, a chamber opening into the cylinder, and also communicating with the discharge pipe, another chamber adjacent to the first-named chamber, a pipe connecting this chamber with the cylinder, a valve stem provided at one end with an exhaust valve adapted to close the opening of the first-named chamber to the cylinder, and at its opposite end provided with a valve-piston working in the last-named chamber, a piston working in the cylinder said piston adapted at the completion of its outstroke to uncover the pipe connecting one of the chambers with the cylinder to admit gas to pass into said pipe, and at the completion of its instroke to also uncover said pipe, to establish a passage from the pipe to the rear of the piston, whereby the gas is free to flow from the pipe through the open end of the cylinder, and means for feeding gas to the cylinder, substantially as set forth.

2. In a gas-engine, the combination, of a cylinder, a chamber opening into the cylinder, and also communicating with a discharge, another chamber adjacent to the first-named chamber, a pipe connecting this chamber with the cylinder, a valve-stem provided at one end with an exhaust valve adapted to close the opening of the first-named chamber leading to the cylinder, and at its opposite end provided with a valve-piston working in the last-named chamber, a supplemental pipe leading from the pipe of the valve-piston chamber to the cylinder, a valve within said pipe, means for opening said valve, a piston working in the cylinder, said piston adapted at the completion of its outstroke to admit gas into the pipe connecting one of the chambers with the cylinder, and at the completion of its instroke to allow for the escape of the gas from the pipe to the exterior, means for operating said piston, and means for feeding gas to the cylinder, substantially as set forth.

3. In a gas-engine, the combination, of a cylinder, provided at its front end with an open-ended casing surrounded by, and communicating with, an evaporator-cup, a valve controlling the end of the casing leading to the cylinder, a piston reciprocating in the cylinder, means for feeding gas to the evaporator-cup which gas is drawn into the cylinder by the back stroke of the piston and the consequent opening of the valve controlling the open-ended casing, and means for exhausting the gas in front of the piston on the instroke of the piston, substantially as set forth.

4. In a gas-engine, the combination, of a cylinder provided at its front with an open-ended casing surrounded by, and in communication with, an evaporator cup, a valve controlling the end of the casing leading to the cylinder, a generator cup beneath the opposite open end of the casing, a piston reciprocating in the cylinder, means for feeding gas to the evaporator cup, which gas is drawn into the cylinder by the back stroke of the piston and the opening of the valve controlling the open-ended casing, means for exhausting the gas in front of the piston, and a conduit for the exhaust, said conduit carrying the exhaust in close proximity to the generator-cup for the purpose of heating the oil contained in said cup, and converting the same into gaseous form, substantially as set forth.

5. In a gas-engine, the combination, of a cylinder provided at its front with an open-ended casing, the upper open end of said casing communicating with a passage to the cylinder, said casing surrounded by, and in communication with, an evaporator-cup, a valve controlling the end of the casing leading to the cylinder, a pipe above the passage leading to the cylinder, said pipe having communication with a source of heat supply, an ignition tube within said pipe, said tube communicating with the passage leading to the cylinder, a piston reciprocating in the cylinder, means for feeding gas to the evaporator cup, which gas is drawn into the cylinder by the back stroke of the piston, and the consequent opening of the valve controlling the open-ended casing, and means for exhausting the gas in front of the piston on the instroke of said piston, substantially as set forth.

6. In a gas engine, the combination, of a cylinder, a piston working therein, a piston rod extending therefrom, a shaft having one end provided with an eccentric extension, a secondary shaft passing through the first-named shaft, and provided upon its end with an eccentric, a fly wheel mounted upon the shaft and operated by the piston rod, a double pump having a valve-controlled communicating passage, one of said pumps communicating with a source of supply, and the other pump in communication with the cylinder for feeding gas to said cylinder, pistons working in the cylinders of the pumps, the piston rod of the pump communicating with the source of supply connected to the eccentric end of the main shaft, and the piston rod of the other pump connected to the eccentric of the secondary shaft, and means for rotating the secondary shaft, substantially as set forth.

7. In a gas engine, the combination, of a cylinder, a piston working therein, a piston rod extending therefrom, a shaft having one end provided with an eccentric extension, a secondary shaft passing through the first-named shaft, and provided upon its end with an eccentric, a fly wheel mounted upon the shaft, and operated by the piston rod, a double pump having a valve-controlled communicating passage, one of said pumps connected with a source of supply, and the other pump in communication with the cylinder for feeding gas to said cylinder, pistons working in the cylinders of the pumps, the piston rod of the pump communicating with the source of supply connected to the eccentric end of the main shaft, and the piston rod of the other pump connected to the eccentric of the secondary shaft, a crank upon the inner end of the secondary shaft, a bell-crank lever pivoted to the fly wheel, said lever having its long arm weighted, and its short arm connected to one end of a spring, the opposite end of said spring also connected to the fly wheel, and a link connecting the bell-crank lever with the crank of the secondary shaft, substantially as set forth.

In testimony whereof I affix my signature in presence of two witnesses.

HENRY A. WEEKS.

Witnesses:
THEO. WEEKS,
J. T. FLANDERS.